US012448183B2

(12) United States Patent
Wellhöfer-Meyer

(10) Patent No.: US 12,448,183 B2
(45) Date of Patent: Oct. 21, 2025

(54) CLOSURE CAP FOR LIQUID CONTAINERS

(71) Applicant: Heinlein Plastik-Technik GmbH, Ansbach-Eyb (DE)

(72) Inventor: Saskia Wellhöfer-Meyer, Ansbach-Eyb (DE)

(73) Assignee: Heinlein Plastik-Technik GmbH, Ansbach-Eyb (DE)

( * ) Notice: Subject to any disclaimer, the term of this patent is extended or adjusted under 35 U.S.C. 154(b) by 50 days.

(21) Appl. No.: 18/519,146

(22) Filed: Nov. 27, 2023

(65) Prior Publication Data

US 2024/0174412 A1 May 30, 2024

(30) Foreign Application Priority Data

Nov. 29, 2022 (DE) ..................... 10 2022 212 823.0

(51) Int. Cl.

*B65D 47/18* (2006.01)
*A61J 1/14* (2023.01)
*B65D 1/02* (2006.01)
*B65D 1/08* (2006.01)
*B65D 41/04* (2006.01)
*B65D 53/02* (2006.01)

(52) U.S. Cl.

CPC ............ *B65D 47/18* (2013.01); *A61J 1/1418* (2015.05); *B65D 1/0207* (2013.01); *B65D 1/0246* (2013.01); *B65D 1/08* (2013.01); *B65D 41/0442* (2013.01); *B65D 53/02* (2013.01); *B65D 2251/205* (2013.01)

(58) Field of Classification Search

CPC .... B65D 47/18; B65D 1/0207; B65D 1/0246; B65D 1/08; B65D 41/0442; B65D 53/02; B65D 2251/2051; A61J 1/1418

USPC ........................................................ 215/228

See application file for complete search history.

(56) References Cited

U.S. PATENT DOCUMENTS

| | | | | |
|---|---|---|---|---|
| 3,788,510 A | 1/1974 | Collins | | |
| 5,884,788 A | 3/1999 | Wilde | | |
| 2013/0032565 A1 * | 2/2013 | Fox | B65D 51/005 215/247 | |

(Continued)

FOREIGN PATENT DOCUMENTS

| | | |
|---|---|---|
| DE | 3816111 A1 | 6/1989 |
| DE | 19860147 C1 | 5/2000 |
| DE | 60013261 | 9/2004 |

(Continued)

*Primary Examiner* — Orlando E Aviles
*Assistant Examiner* — Niki M Eloshway
(74) *Attorney, Agent, or Firm* — Smartpat PLC

(57) ABSTRACT

A closure cap for liquid containers, in particular for medicine bottles, includes a cover section, a screw collar arranged thereon with an internal thread for screwing onto an external thread of the liquid container, a functional insert, in particular a dropper or dosing insert, which can be detachably fixed in the closure cap by means of a base section for assembly purposes, and a snap connection between the closure cap and the functional insert, which snap connection is formed by an inwardly projecting bulge projection which runs at least in sections around the inner wall of the closure cap and a latching web which is arranged on the functional insert, is resilient in the radial direction, runs at least in sections around the base section and engages behind the bulge projection in an intermediate assembly position.

20 Claims, 3 Drawing Sheets

(56) References Cited

U.S. PATENT DOCUMENTS

| | | | | |
|---|---|---|---|---|
| 2021/0047085 | A1* | 2/2021 | Jin | B65D 1/32 |
| 2022/0218566 | A1* | 7/2022 | Lodge | A61J 1/1418 |

FOREIGN PATENT DOCUMENTS

| | | | | | |
|---|---|---|---|---|---|
| DE | 102019214085 | A1 | | 3/2021 | |
| EP | 3470349 | A1 | | 4/2019 | |
| FR | 2737193 | A1 | | 1/1997 | |
| GB | 804936 | A | | 11/1958 | |
| KR | 2328232 | B1 | * | 11/2021 | A45D 34/04 |
| KR | 20220157116 | A | * | 11/2022 | |
| WO | WO-2011095877 | A1 | * | 8/2011 | A47J 27/21191 |
| WO | WO-2020080678 | A1 | * | 4/2020 | A45D 34/04 |

* cited by examiner

CLOSURE CAP FOR LIQUID CONTAINERS

CROSS-REFERENCE TO RELATED APPLICATION

This application claims the priority of German Patent Application, Serial No. DE 10 2022 212 823.0, filed Nov. 29, 2022, the content of which is incorporated herein by reference in its entirety as if fully set forth herein.

TECHNICAL FIELD

The disclosure relates to a closure cap for liquid containers and in particular for medicine bottles.

BACKGROUND

Closure caps for liquid containers are known from the prior art in many different embodiments. Their main elements are a cover section and a screw collar arranged thereon with an internal thread with which the closure cap can be screwed onto an external thread of the liquid container.

Furthermore, the closure cap has a functional insert that can be detachably fixed in the closure cap with a base section for assembly purposes. Depending on the intended use, such functional inserts are, for example, dropper or dosing inserts with which liquid pharmaceuticals can be dispensed from the liquid container in a controlled manner.

From DE 10 2019 214 085 B4 a closure cap with a hinged lid is known, in which a dropper insert is integrally molded onto the closure cap.

The basic concept of a closure cap with a cover section around a screw collar as well as a functional insert and a sealing washer between the latter and the closure cap is known from DE 198 60 147 C1 by the applicant.

Various anchoring measures for fixing the sealing washer in a closure cap can be found, for example, in EP 3 470 349 A1 or DE 600 13 261 T2. Here, either projections on the outer edge of the sealing washer are provided for engagement in respective mating elements on the closure cap, such as an internal thread in EP 3 470 349 A1, or adhesive connections, such as in DE 600 13 261 T1.

DE 38 16 111 A1 describes a container closure for a container with a lid wall, a screw collar arranged thereon with an internal thread for screwing onto an external thread of the container and a dropper insert which can be fixed in the container closure with a contact edge, whereby fixing takes place via ribs of the functional insert.

SUMMARY

A closure cap for liquid containers, in particular for medicine bottles, comprises a cap body with cover section and a screw collar arranged thereon. The screw collar has an internal thread for screwing onto an external thread of the liquid container. A functional insert, in particular a dropper or dosing insert, can be detachably fixed in the cap body by means of a base section for assembly purposes.

In production technology, it is now essential that the caps, which are produced by the manufacturer of the closure cap and consist of several parts, can already be pre-assembled with the closure manufacturer and thus stored and delivered to the filling plant for the liquid containers. There, the closure cap is automatically screwed onto the external thread of the liquid container after it has been filled, and at the same time the functional insert is fixed in the neck of the liquid container. The first time the closure cap is unscrewed from the liquid container, the pre-assembly connection between the closure cap and the functional insert is detached.

The closure cap fulfils these requirements of production technology, in particular in that it enables temporary fixing of the functional insert in the closure cap in a constructively particularly simple manner.

The problem of temporarily fixing the functional insert in the closure cap is solved in a structurally particularly simple and at the same time clever manner by a snap connection between the closure cap and the functional insert. The snap connection is formed by an inwardly projecting bulge projection, which extends at least in sections around the inner wall of the closure cap, and a latching web which is arranged on the functional insert, is resilient in the radial direction, extends at least in sections around the base section and engages behind the bulge projection in the intermediate assembly position.

The separately manufactured parts of the closure cap can thus usually be prefabricated by injection molding and then intermediately assembled by simply snapping the functional insert to the closure cap, thus holding both elements together in a captive and position-defined manner.

When configuring the latching force between the closure cap and the functional insert, it is only necessary to ensure that it is lower than a retention force of the functional insert in its assembled position in the neck of the liquid container. As a result, it is ensured that when the closure cap is first screwed onto the liquid container, the functional insert is anchored in the neck of the bottle and is subsequently no longer loosened by disengaging the latch between the functional insert and the closure cap.

The following description indicates preferred further embodiments of the invention. Accordingly, the bulge projection on the inside of the closure cap can run continuously around its inner wall. This achieves a uniformity of the latching between the closure cap and the functional insert.

Preferred dimensional ranges for the radial projection are 0.3 mm to 1.0 mm radially inwards. A projection with a dimension of about 0.5 mm, or 0.5 mm±0.1 mm, is particularly preferred. This represents a good compromise between latching and its detachability after final assembly of the closure cap on a liquid container.

As a measure that is analogous to the circumferential bulge projection, according to a further preferred embodiment, it is provided that the latching web also runs continuously around the base section of the functional insert. In this manner, the closure cap and the functional insert can be equally fixed to each other in any rotational position relative to each other.

A further preferred embodiment provides for an skirt-shaped design of the latching web. This particularly favors the spring behavior of the latching web.

A preferred further embodiment further provides for a conical widening of the latching web in the direction of its marginal edge engaging behind the bulge projection. Due to this design of the latching web, its annular outer surface acts as a kind of run-up guide on which the bulge projection slides during the assembly process of the functional insert into the closure cap and leads to a gradual inward deflection of the latching web until it latches with its marginal edge behind the bulge projection. It is then no longer possible for the functional insert to fall out of the closure cap easily in this pre-assembly position.

In the case of closure caps for liquid containers, the tightness of the closure cap in its screwed-on position on the liquid container is also fundamentally important. This is particularly relevant for volatile container contents that require additional measures, such as, as is known, the insertion of a sealing washer between the cover section and the base section of the functional insert. In the case of such closure caps with sealing washers, there is also the problem of positioning this additional part reliably and in a stable position next to the functional insert for prefabrication of the closure cap with its manufacturer. In the prior art, adhesive connections are known for this purpose, but this should generally be avoided for hygienic reasons, for example in the case of liquid food products, food supplements or pharmaceuticals. Furthermore, there is the problem that the adhesive of the adhesive connection can interact with the contents of the bottle and, for example, the contents of the bottle can be contaminated by dissolved adhesive.

To avoid such an adhesive connection, according to a further preferred embodiment, it is provided to hold the sealing washer at its outer edge by means of an additional internal thread on the screw collar in the closure cap. This ensures a reliable, adhesive-free fixation of the sealing washer, in particular during the intermediate assembly steps for prefabricating the closure cap with the manufacturer.

A particularly reliable fixation can be achieved with a multi-start design of the additional internal thread. If the pitches of the internal thread and the additional internal thread are the same, this represents a simplification in terms of production technology, as the closure cap can then be removed from the injection molding tool more easily.

A sealing washer that is particularly effective for liquid ingredients is implemented by an aluminum-foam composite washer.

In the context of closure caps in which a sealing washer is provided, it should be noted that the aforementioned relevant embodiments can also be used in the context of functional inserts which do not have a snap connection consisting of a bulge projection on the closure cap and a latching web on the functional insert. That is, a closure cap may include a sealing washer held within the cap body just below the cover section by an internal thread that engages a peripheral edge of the sealing washer, irrespective of whether a functional insert is present, or how a functional insert is held in the cap body.

Further features, details and advantages of the invention will be apparent from the following description of an embodiment example with reference to the accompanying drawings.

DETAILED DESCRIPTION

Figure 1:
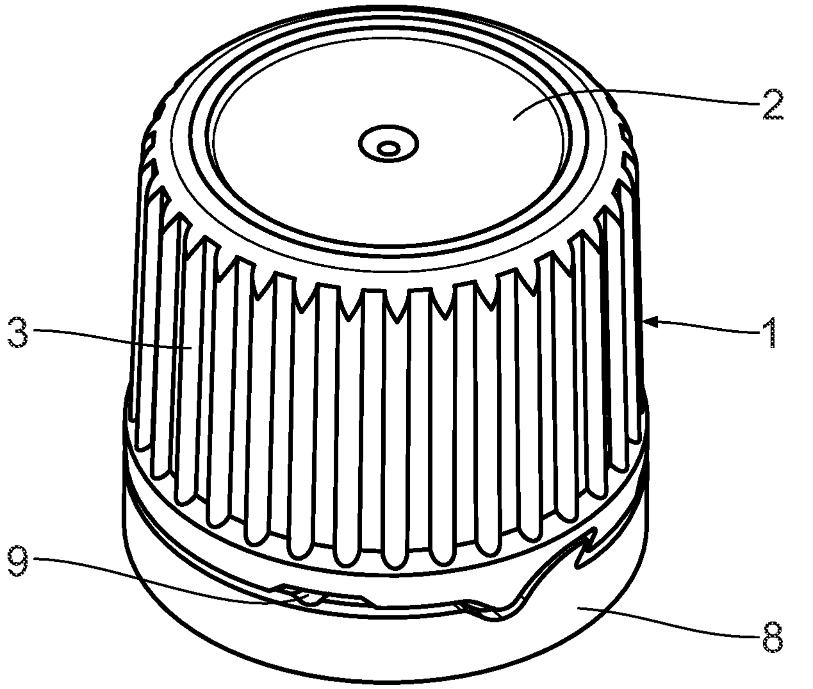
FIG. 1 shows a perspective view of a closure cap.

As shown in the drawings, a closure cap 1 is provided with a cap body 21 including a circular cover section 2 and a screw collar 3 formed directly thereon. The screw collar 3 has an internal thread 5 on its inner side at a height of approximately ⅔ from the lower edge 4 for screwing the closure cap 1 onto an external thread 6 of a neck 7 of a liquid container shown in FIGS. 3 and 4. A tamper-evident ring 8 is formed in one piece on the lower edge 4 of the closure cap 1 by means of thin breaking webs 9, the construction and mode of operation of which are described in detail in DE 10 2005 040 745 A1 by the applicant and therefore do not require any further explanation here.

Figure 3:
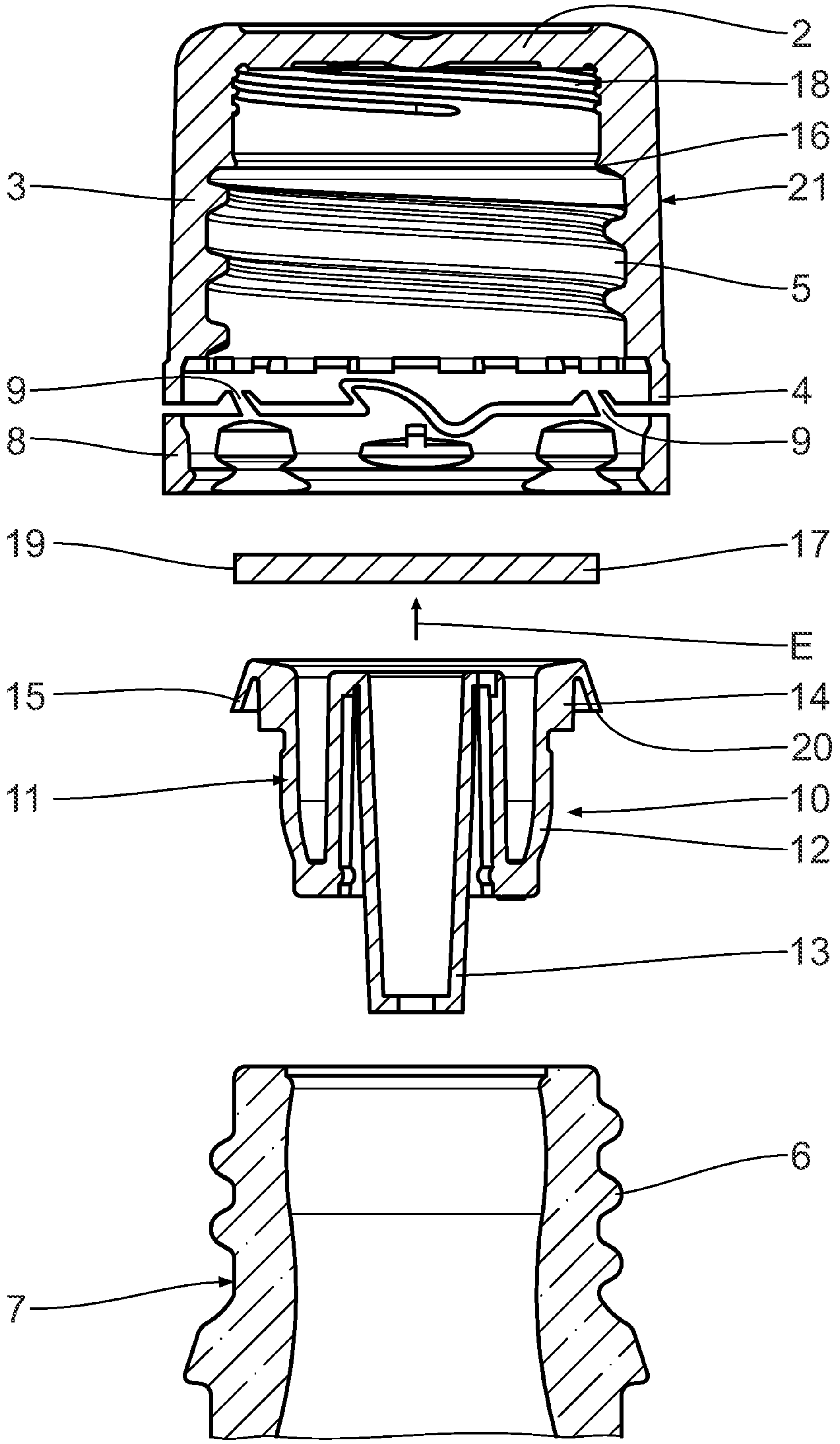
FIG. 3 shows an exploded representation, sectioned in the axial plane, of a closure cap with an associated threaded neck of a liquid container.

As shown particularly clearly in FIG. 3, a functional insert 10 in the shape of a so-called dropper is provided, which has a sleeve-shaped base body 11. The outer side of the sleeve-shaped base body wall 12 is somewhat convex in shape in order to stabilize the functional insert 10 in its position in the container neck 7, which has a slightly concave profile on the inside.

A standard drip tube 13 is molded centrally in the base body 11, the design of which ensures that the liquid stored in the container escapes in the form of drops. The design of this drip tube 13 is known and therefore requires no further explanation. Other inserts, such as dosing inserts with eccentrically arranged drip openings and aeration tubes, which are also known from the prior art, can also be used as functional inserts.

Figure 2:
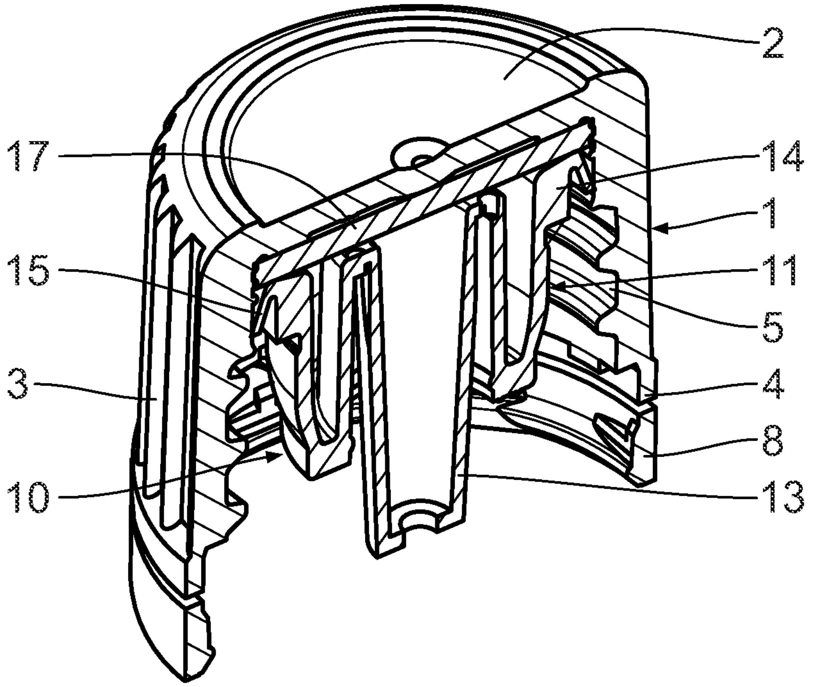
FIG. 2 shows a perspective, fractured view of the closure cap according to FIG. 1.
Figure 4:
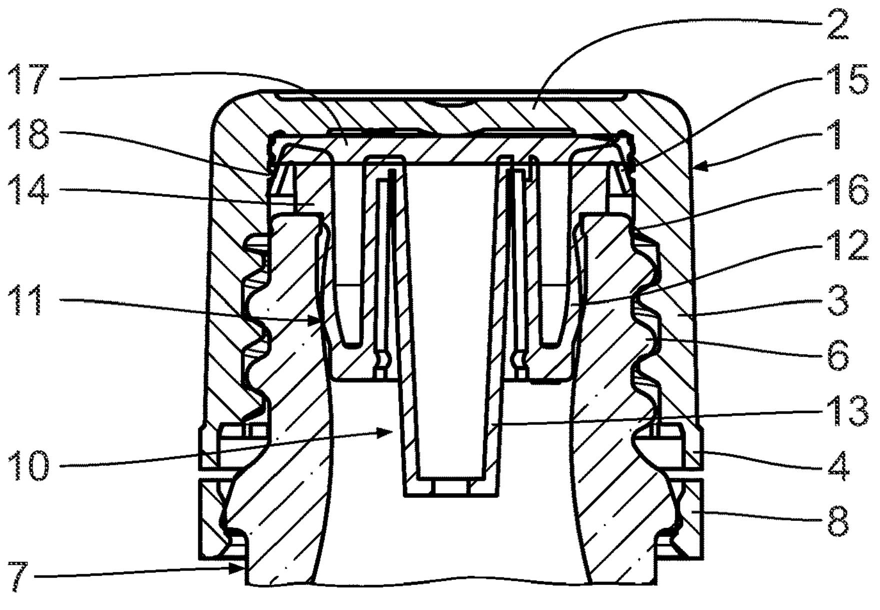
FIG. 4 shows an axial section of the closure cap in the assembled state on the threaded neck of a liquid container.
Figure 5:
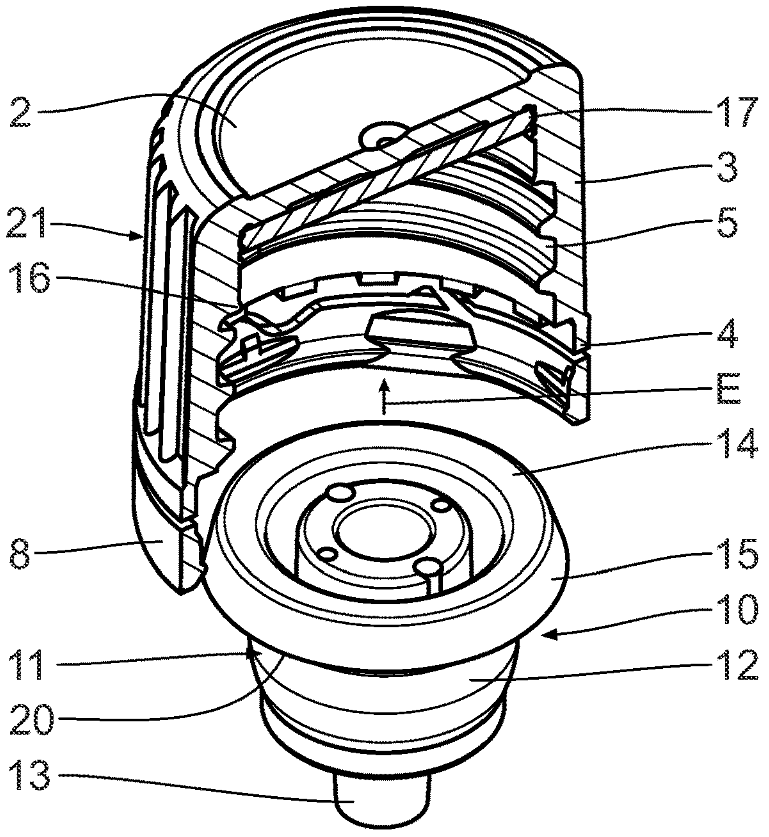
FIG. 5 shows a perspective, partially sectioned-off view of the closure cap with sealing washer and functional insert.

At the upper edge pointing into the closure cap 1 in the direction of engagement E of the functional insert 10, the base body 11 is provided with a thickened, annularly circumferential base section 14 which, on the one hand, with its edge pointing against the direction of engagement E, serves as a stop and sealing edge of the functional insert 10 against the container neck 7—see FIG. 4. On the other hand, the base section 14 serves to form a latching web 15 which runs around in the circumferential direction and is resilient in the radial direction and which, together with an inwardly projecting bulge projection 16 which is arranged above the internal thread 5 on the inside of the closure cap 1 and also runs around in an annular manner, ensures that the functional insert 10 is reliably fixed in the closure cap 1 in the preassembled assembly state according to FIG. 2, as will be explained in more detail later.

A sealing washer 17 made of an aluminum-foam composite material is further inserted between the base section 14 of the functional insert 10 and the cover section 2 of the closure cap. Such sealing washers are commercially offered, for example, under the brand name "ALKOzellr" by Meyer Seals Alfelder Kunststoffwerke Herm. Meyer GmbH, 31061 Alfeld, D E. This type of sealing washer 17 provides an additional, extremely effective barrier for any contents, in particular volatile contents, in the liquid container. The sealing washer 17 is fastened directly below the cover section 2 of the closure cap 1 by means of an additional internal thread 18 integrally molded there on the inside of the screw collar 3, which is designed with multiple starts, in the example shown with four starts, and has the same pitch as the internal thread 5 on the closure cap 1. The outer diameter of the sealing washer 17 is designed in such a manner that the peripheral edge 19 digs into the threads of the additional internal thread 18, which not only achieves good mechanical anchoring but also an improved sealing effect.

After the individual components have been produced by the closure cap manufacturer, the components closure cap 1, sealing washer 17 and functional insert 10 are joined together by successively or simultaneously anchoring the sealing washer 17 in the additional internal thread 18 and inserting the functional insert 10 into the closure cap 1 from below. In the process, the skirt-shaped latching web 15, which widens conically against the direction of engagement E in the direction of its marginal edge 20 engaging behind the bulge projection 16, runs onto the bulge projection so that the latching web 15 is increasingly pressed inwards until it finally engages with its marginal edge 20 behind the bulge projection 16 and is anchored there. At the same time, the base section 14 of the functional insert 10 presses the sealing washer 17 against the cover section 2, which further improves the sealing effect.

A closure cap 1 prefabricated in this manner to include a sealing washer 17 and a functional insert 10 can be stored without any problems and can also be handled for the transport and assembly of the closure cap 1 onto a container neck 7, for example by automatic assembly machines, as there is no need to fear any separation of the individual components mentioned.

In this assembly process, the prefabricated closure cap 1 is screwed with its internal thread 5 onto the external thread 6 on the container neck 7. In the process, the base body 11 of the functional insert 10 penetrates into the container neck 7 until the base section 14 abuts against the edge of the container neck. The functional insert 10 is thus captively mounted on the container neck 7. When the closure cap 1 is unscrewed from the container neck 7 for the first time, not only is the tamper-evident ring 8 detached in the known manner, but the latching between the closure cap 1 and the functional insert 10 is also disengaged, in which the bulge projection 16 is pulled back upwards over the marginal edge 20 of the latching web 15 due to the fixing of the functional insert 10 in the container neck, thus detaching the connection between these two components. In this state, the sealing washer 17 is reliably prevented from falling out by the additional internal thread 18.

What is claimed is:

1. A closure cap (1) for a liquid container, comprising a cap body (21), including a cover section (2), a screw collar (3) with an internal thread (5) for screwing onto an external thread (6) of the liquid container, the internal thread (5) having an internal thread diameter, and an inwardly projecting bulge projection (16) which runs at least in sections around an inner wall of the cap body (21), the inwardly projecting bulge projection (16) having a bulge diameter that is smaller than the internal thread diameter; and a functional insert (10) detachably fixed in the cap body (21) in a preassembled state before the closure cap (1) is screwed onto the liquid container, including a base section (14), and a latching web (15) which is arranged on the functional insert (10), is resilient in a radial direction, extends at least in sections radially outward and downward around the base section (14), and engages above the inwardly projecting bulge projection (16).

2. A medicine bottle, comprising the closure cap according to claim 1, wherein the functional insert is anchored in a neck of the medicine bottle by screwing the closure cap (1) in the preassembled state onto the medicine bottle, and wherein the functional insert is retained in the neck of the medicine bottle after removing the closure cap from the medicine bottle.

3. The closure cap according to claim 1, wherein the functional insert (10) is a dropper insert or a dosing insert.

4. The closure cap according to claim 1, wherein the inwardly projecting bulge projection (16) extends continuously around the inner wall of the closure cap (1).

5. The closure cap according to claim 1, wherein the inwardly projecting bulge projection (16) projects radially inwards by 0.3 mm to 1.0 mm.

6. The closure cap according to claim 1, wherein the inwardly projecting bulge projection (16) projects radially inwards by 0.5 mm+0.1 mm.

7. The closure cap according to claim 1, wherein the latching web (15) extends continuously around the base section (14) of the functional insert (10).

8. The closure cap according to claim 1, wherein the latching web (15) is integrally formed on the base section (14) of the functional insert (10).

9. The closure cap according to claim 1, wherein the latching web (15) is configured in the shape of a skirt.

10. The closure cap according to claim 1, wherein the latching web (15) widens conically towards a marginal edge (20) engaging behind the bulge projection (16).

11. The closure cap according to claim 1, further comprising a sealing washer (17) inserted between the cover section (2) and the base section (14) of the functional insert (10), wherein the sealing washer (17) is held free of adhesive at a peripheral edge (19) by an additional internal thread (18) on the screw collar (3) in the cap body (21) and is additionally secured by the functional insert (10).

12. The closure cap according to claim 11, wherein the additional internal thread (18) is designed with multiple starts.

13. The closure cap according to claim 11, wherein pitches of the internal thread (5) and the additional internal thread (18) are equal.

14. The closure cap according to claim 11, wherein the sealing washer (17) is an aluminum foam composite washer.

15. The closure cap according to claim 11, wherein the inwardly projecting bulge projection (16) is arranged between the internal thread (5) and the additional internal thread (18).

16. The closure cap according to claim 15, wherein the diameter of the internal thread (5) is larger than a diameter of the additional internal thread (18).

17. The closure cap according to claim 1, further comprising a tamper-evident ring (8) formed in one piece on a lower edge of the closure cap, the tamper-evident ring (8) being arranged below the functional insert (10) in the preassembled state before the closure cap (1) is screwed onto the liquid container and configured to detach from the closure cap and remain on the liquid container when the closure cap is first removed from the liquid container after assembly.

18. The closure cap according to claim 1, wherein the preassembled state is released when the inwardly projecting bulge projection (16) is pulled upwardly over a marginal edge (20) of the latching web (15) when the closure cap is first removed from the liquid container after assembly.

19. The closure cap according to claim 1, wherein a latching force of the functional insert (15) in the closure cap is smaller than a retention force of the functional insert in the liquid container after the closure cap has been screwed onto the liquid container.

20. The closure cap according to claim 1, wherein a lower edge of the base section (14) abuts an upper rim of the liquid container, and wherein the latching web (15) is arranged above the upper rim of the liquid container.

* * * * *